Jan. 19, 1943.                R. D. NICHOLS                2,309,002
                       APPARATUS FOR SEWAGE TREATMENT
                           Filed Dec. 10, 1940
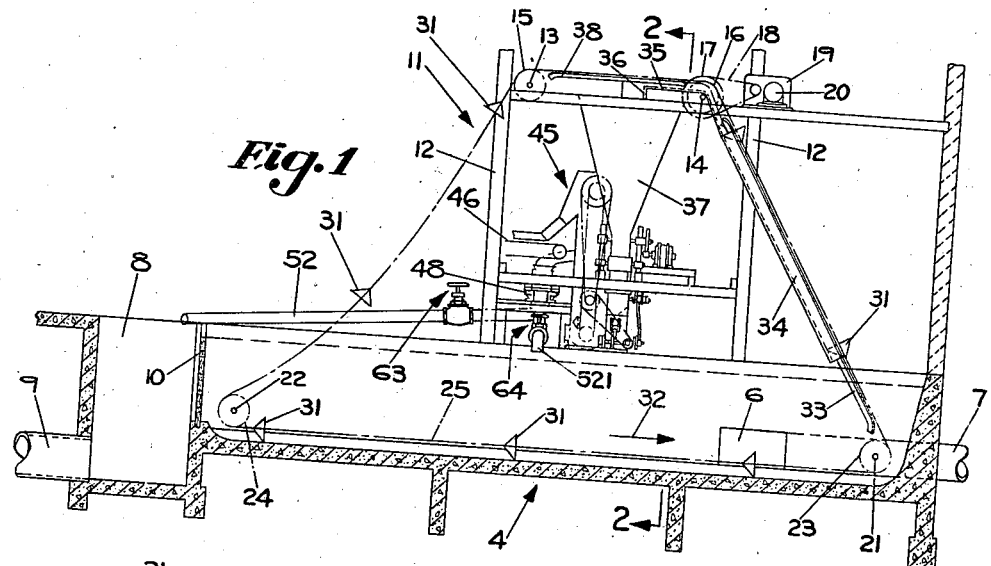
*Fig. 1*
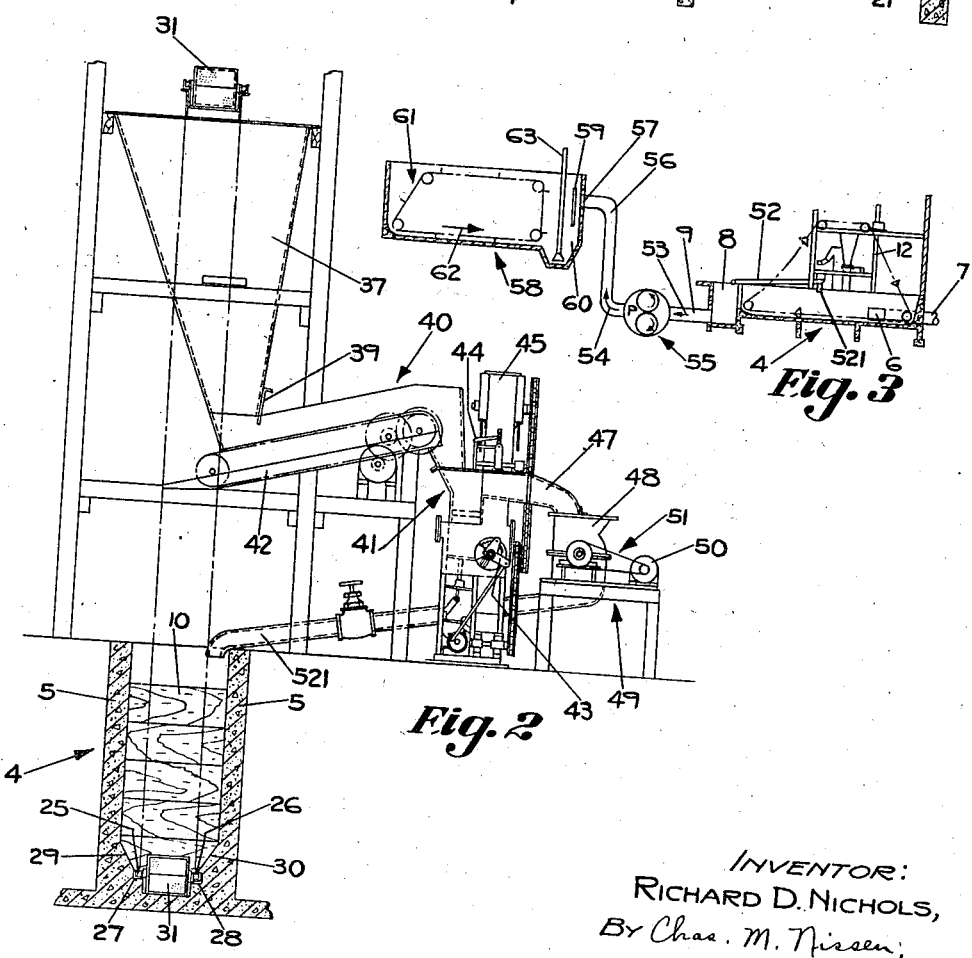
*Fig. 2*
*Fig. 3*
INVENTOR:
RICHARD D. NICHOLS,
By Chas. M. Nissen,
ATT'Y.

Patented Jan. 19, 1943

2,309,002

UNITED STATES PATENT OFFICE 2,309,002

APPARATUS FOR SEWAGE TREATMENT

Richard D. Nichols, Columbus, Ohio, assignor to The Jeffrey Manufacturing Company, a corporation of Ohio Application December 10, 1940, Serial No. 369,471

9 Claims. (Cl. 210—3)

My invention relates to apparatus for separating grit or inorganic matter from sewage and reducing the organic matter associated with the grit to such a finely divided condition as to readily flow through conduits and passageways without clogging the same, during further treatment.

Another object of the invention is the provision of an improved sewage treating system by means of which the settled organic and inorganic solids are removed from the sewage flow line, separated from each other, the inorganic matter removed, the organic matter ground to a pulp and returned to the sewage flow line without clogging conduits or passageways in the system.

A further object of the invention is the provision of automatically operated mechanism for removing from a grit channel or settling tank settled organic and inorganic solids, separating and removing the inorganic solids, finely grinding the organic solids from which the inorganic solids are removed, and directing without obstruction the ground organic material into the sewage flow line for further treatment including digestion.

A still further object of the invention is the provision of means for removing from a grit channel or settling tank settled organic and inorganic solids, separating and removing some of the inorganic solids, finely grinding the remaining mixture of organic and inorganic solids, and returning the ground mixture to the settling tank to let the inorganic solids of the mixture settle while the ground organic solids remain in suspension for flow from the tank in the sewage flow line for further treatment in the sewage treatment system.

Other objects of the invention will appear hereinafter, the novel features and combinations being set forth in the claims hereto appended.

In the accompanying drawing,

Fig. 1 is a longitudinal sectional elevational view of the apparatus for sewage treatment embodying my improvements;

Fig. 2 is a transverse sectional elevational view taken on the line 2—2 of Fig. 1 looking in the direction of the arrows; and Fig. 3 is a sectional elevational view, more or less diagrammatic, to illustrate the adaptation of my improvements to sewage treatment.

In the sewage treatment system it is desirable not only to remove the inorganic material or undigestible grit but to also reduce the organic matter to such a condition as to not clog any part of the system and to be readily subjected to digestion treatment. Immediately after the undigestible grit has been separated from the organic material, the organic material should be comminuted for free flow into the sewage treatment system. The apparatus herein disclosed operates automatically either continuously or intermittently to remove settled organic and inorganic materials from a grit channel or settling chamber to a jig or classifier which separates the grit or inorganic material from the organic material, the latter then being ground to such a finely divided condition as to readily flow through pipes and pumps and into other sedimentation chambers in the system, such grinding of the organic material also facilitating complete treatment including digestion.

In the accompanying drawing the apparatus illustrated includes a grit channel or settling tank 4 comprising side walls 5, 5. Adjacent one end of the settling tank 4 is an influent opening 6 with which communicates the influent conduit 7. At the left-hand end of the settling tank 4, as viewed in Fig. 1, is an effluent sump or auxiliary tank 8 from the lower portion of which extends an effluent conduit 9. The settling tank 4 and the effluent sump 8 may be integral as both are preferably formed as a monolith of poured concrete.

Inasmuch as the settling tank 4 is relatively narrow and elongated it may be regarded as a grit channel in which the sewage flows slowly from the influent opening 6 toward the effluent sump 8 over a weir 10 composed of a plurality of boards or planks stacked one on top of another between the grit channel 4 and the effluent sump 8, as shown in Figs. 1 and 2. By varying the number of boards or planks of the weir 10, the normal level of the sewage in the grit channel 4 may be varied.

As the sewage flows slowly through the grit channel from right to left, as viewed in Fig. 1, the inorganic materials will settle to the bottom of the grit chamber and carry with them such organic materials as adhere thereto. Of course, organic solids may also settle to the bottom of the grit channel although not adhering to inorganic materials.

In the collection of grit from the grit channel such low velocity of flow must be utilized as to effect sedimentation of the fine grit. This results in a rather high percentage of coarse organic solids also settling to the bottom of the grit chamber.

Conveyor mechanism 11 is provided to remove the settled materials, both organic and inorganic, from the bottom of the grit chamber. Such conveyor mechanism may be generally of the form disclosed in the patent to Robert E. Briggs, No. 2,102,990, granted December 21, 1937, for Material treating apparatus.

The conveyor mechanism 11 comprises a supporting frame 12, 12 carrying spaced-apart transverse shafts 13, 14 which are rotatably supported by appropriate journal bearings and which carry the sprockets 15, 16. An additional sprocket 17 associated with the shaft 14 is connected by means of a sprocket chain 18 to speed reducing mechanism 19 driven by an electric motor 20.

Within the grit channel 4 is mounted a shaft 21 near the influent opening 6, and at the other end of the grit channel is mounted a shaft 22 near the effluent end. The shafts 21 and 22 may be supported from the side walls 5, 5 of the grit channel 4 by appropriate journal bearings. A sprocket 23 may be associated with the shaft 21, and a sprocket 24 may be associated with the shaft 22. It should be understood that each of the shafts 13, 14, 21 and 22 has connected to the ends thereof sprockets for meshing with spaced-apart sprocket chains 25, 26 shown in Fig. 2. The sprocket chains 25, 26 are adapted to ride on appropriate angle members 27, 28 imbedded in the tapered lower portions 29, 30 of the side walls 5, 5 during their travel between the sprockets 23 and 24.

Carried between the draft chains 25, 26 are a plurality of V-buckets 31, 31 with their open sides facing toward the right, as viewed in Fig. 1. These buckets are preferably perforated to permit the free drainage of liquid when they ascend from the grit channel.

When the motor 20 operates, it drives the shaft 14 in an anti-clockwise direction as viewed in Fig. 1 and effects movement of the scraping buckets 31 in the direction of the arrow 32 of Fig. 1. The buckets therefore scrape the settled materials, both organic and inorganic, from the bottom of the grit channel 4 and lift such materials out of the sewage in the grit channel while the water drains through the perforations back into the grit channel while above the latter.

Between the sprockets 23 and 16 spaced rails 33 support the draft chains 25, 26 and below the latter is mounted a drain chute 34 which directs trained liquid which flows through the perforated bottoms of the buckets 31, back into the grit channel 4. After each bucket 31 passes over the sprocket 16 it dumps its contents of solid organic and inorganic materials on to a platform 35 over which the dumped material will be scraped by the buckets until it falls over a ledge 36 of said platform into a large receiving hopper 37. Supporting rails 38 may be provided for the draft chains 25, 26 between the sprockets 15 and 16.

Therefore, when the conveyor apparatus 11 operates it collects settled solids, both organic and inorganic, from the bottom of the grit chamber 4 and delivers it to the hopper 37 after most of the water has been drained therefrom and dripped back into the grit chamber. While the motor 20 may be started and stopped as desired and therefore intermittent operation secured, it should be understood that the conveyor mechanism may be operated continuously if desired.

At the bottom of the hopper 37 is an adjustable gate 39 for controlling the discharge of the solid materials, organic and inorganic, from said hopper 37 to an apron conveyor mechanism 40 which is shown in Fig. 2 sloping upwardly from the bottom of the hopper.

The delivery end of the apron conveyor 40 discharges the materials, organic and inorganic, into a jig or classifier 41. Due to the upward slope of the conveyor mechanism 40, any liquid still adhering to the conveyed materials will flow toward the left as viewed in Fig. 2 and drop into the grit channel, the lower end of the conveyor mechanism 40 being located directly above the grit channel. A drain chute 42 is preferably placed under the endless conveyor 40 for this purpose. It will thus be seen that by the time the material has reached the jig or classifier 41, much of the water clinging thereto has been drained therefrom into the grit channel.

The jig 41 may be of standard construction and include one or more compartments. Such jig may be of the type disclosed in the Bird et al. Patent No. 2,132,375, granted October 11, 1938, for an improvement in Apparatus for treating mineral materials. Such jig comprises a screen over which the materials, organic and inorganic, travel. Upward and downward pulsations of water relative to the screen will be effected by a diaphragm operated from an appropriate drive mechanism. In the operation of the jig the materials, organic and inorganic, will be subjected to the upward pulsating movements of water which will be effective to clean each individual grit particle of adhering foreign matter, such as the organic materials. At the same time the bed of materials, organic and inorganic, will be stratified with the high gravity inorganic materials or grit on the bottom, and the lighter gravity organic materials above. In other words, the organic materials will be on top, if not actually floating at the surface of the flowing water in the jig.

This jigging operation effects a very thorough washing because when each successive upward pulsation begins, the bed is closed with the particles of grit or inorganic materials in contact or very close association with each other. Consequently the beginning of each upward impulse to open the bed for the stratification step causes swift upward currents of water between the particles to thoroughly wash them of adhering organic matter. These operations may be readily understood by referring to the said Bird et al. Patent No. 2,132,375 and also to Fig. 3 of my Patent No. 2,132,756, granted October 11, 1938, for Method and apparatus for cleaning sewage grit.

Associated with the screen in the jig is a grit ejector mechanism 43 which is automatically controlled by appropriate float control mechanism 44 to maintain the depth of the grit bed at a predetermined value. The accumulated grit or inorganic material will thus be discharged into the boot of a grit elevator 45 by which it will be discharged onto a belt conveyor 46 and conveyed to the place for storing the cleaned grit. By cleaning the grit or inorganic materials or separating them from the organic materials, the latter are released for flow from the jig 41 through the pipe 47 into the grinder or shredder 48. The grinder 48 is preferably of the type shown in the patent to Ossing, No. 2,141,663, granted December 27, 1938, for an improvement in Sewage shredders. The grinder 48 is shown in Fig. 2 mounted on a table 49 which supports an electric motor 50 provided with a sprocket chain drive 51 for driving the grinder 48. The operation of the grinder 48 effects a comminution of the organic materials to such a finely divided state as to flow freely through the pipe 52 into the effluent sump 8.

In the operation of the jig 41 water is used from a source entirely independent of the sewage, and this water flows continuously through the pipe 47 together with the organic materials from which the grit or inorganic materials have been separated. However, the grinder 48 reduces the organic materials to such a finely divided state as to prevent any tendency thereof to clog the pipe 52. In fact, the finely divided state of the organic materials enables them to remain in suspension in the sewage in the effluent compartment 8 for ready flow in the direction of the arrows 53, 54 through the pump 55 into the pipe 56 and thence through the influent opening 57 in the sedimentation tank 58.

The liquid with the finely divided or comminuted organic materials therein may flow against the baffle plate 59 in the tank 58 for settling in the sump 60.

A scraper conveyor 61 mounted in the sedimentation tank 58 may have its lower run operating in the direction of the arrow 62 to scrape the sludge, settled or separated organic materials, from the bottom of the tank into the sump compartment 60 from which said sludge or settled material may be removed through the suction pipe 63 for transfer to the digesting mechanism.

It should be particularly understood that the comminution of the organic material by means of the grinder 48 is not only for the purpose of facilitating flow through pipes in the system, such as that designated 52, but also to facilitate flow through a pump such as that designated 55 and to render more efficient the treatment of the organic materials in the digesters of the sewage treatment system.

In sewage treating systems it is important to remove all of the grit or inorganic materials from the sewage before it is passed into the next sedimentation chamber or to the digester. In some instances, the jig or classifier is unable to separate all of the inorganic materials or grit from the mixture which the classifier receives. Such inorganic materials as are not removed by the classifier, pass with the organic materials through the pipe 47 into the grinder 48. It is therefore desirable to provide the additional pipe 521 for directing flow of ground material from the grinder 48 back into the grit chamber, as shown in Figs. 1 and 2.

The pipes 52 and 521 are both connected to the bottom of the grinder 48 to receive ground material therefrom. A manually operable valve 63 in the pipe 52 is adapted to control the flow from the grinder 48 into the sump 8, and the manually operable valve 64 is adapted to control the flow from the grinder back into the grit channel 4. If desired, mechanism may be provided so that the flow of ground material from the grinder 48 will be into either the pipe 52 or the pipe 521. When the materials which flow through the pipe 47 from the classifier to the grinder 48 are entirely organic, the valve 64 may remain closed and the valve 63 remain open so that the flow of the ground material will be through the pipe 52 to the sump 8, but when the classifier does not remove all of the grit or inorganic materials, it is desirable to close the valve 63 and open the valve 64 so that the flow of ground material will be through the pipe 521 back into the grit channel.

The grinder 48 is such that the ground or comminuted organic material will be so fine as to be suspended in the liquid when returned through the pipe 521 to the grit chamber 4. In other words, after the mixture of organic and inorganic materials is ground and flowed through the pipe 521 into the grit chamber, the comminuted organic material tends to remain in suspension long enough to flow over the weir 10 into the effluent compartment 8 without settling to the bottom of the grit chamber 4.

Moreover, the grinding frees the inorganic material from the organic material for more efficient settling in the grit chamber and the next time the mixture of organic and inorganic materials from the bottom of the grit chamber is directed to the classifier or jig, the latter will be able to more easily and more efficiently separate all of the grit or inorganic material from the organic material. Consequently the next time that the materials flow through the grinder they will be more free of grit or inorganic material.

In the operation of the system embodying my improved apparatus and method, the sewage containing grit is introduced through the influent opening 6 into the grit channel 4. The sewage flow from right to left, as viewed in Fig. 1, should be at a relatively slow rate to assure settling of the grit or inorganic materials, but the settling of the coarser organic materials can not be avoided. When such coarser particles of organic material are comminuted, however, by passing into the grinder 48, they remain in suspension longer without settling and therefore will flow over the weir 10, leaving the grit or inorganic materials to settle at the bottom of the grit channel 4. In other words, the adjustments should be such that the flow over the weir 10 will be devoid of grit or inorganic materials.

The velocity of flow through the tank 4 will determine the settling rate of the settled material. The rate of flow of the sewage should therefore be sufficiently slow to enable the smallest particles of inorganics to settle in the tank 4. The slower the velocity the greater the assurance that the inorganic materials will properly settle and not flow over the weir 10, but the slower the velocity the more apt the coarser organic materials are to settle. The tendency for the organic materials to settle will, however, be avoided by comminuting them so that they will remain in suspension a sufficient length of time to flow over the weir 10.

After the organic materials have been ground and returned to the grit chamber 4, mixed with some inorganic materials, separation can be more readily effected in the classifier or jig when such organic material as may still settle to the bottom of the grit chamber, passes through the jig with the settled grit.

In fact the jig or classifier may be so operated as to remove the grit or inorganic material only when it is entirely free of organic material, so that when the organic material continues to cling to the inorganic material, it will pass over through the pipe 47 into the grinder 48. But after being ground or reduced to fine particles and returned to the grit chamber, the grit or inorganic material may readily settle to the bottom of the grit chamber while the organic material remains in suspension for flow over the weir 10 because of its finely divided condition. However, if some of the organic material still persists in settling to the bottom of the grit chamber it will be returned to the classifier and then because no longer clinging to the grit, the latter can be readily removed to the conveyor 46 while the re-classified organic material passes again through the grinder for further comminution and greater assurance that it will flow from the grit chamber 4 over the weir 10 into the effluent chamber 8.

Obviusly those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In sewage treating apparatus, the combination with a sewage grit settling tank, of a classifier for separating the organic solids from the grit, means for delivering settled solids in said tank to said classifier, mechanism for comminuting the organic solids received from the classifier, a sedimentation tank for the organic solids, and means for transferring the comminuted organic solids to said sedimentation tank.

2. In sewage treating apparatus, the combination with a sewage grit settling tank, of a jig constructed and arranged to separate organic matter from grit, conveyor means constructed and arranged to collect settled solids from said tank and deliver the same to said jig while draining liquid from said solids back into said tank, a tank for receiving the flow of sewage liquid from said settling tank, means comprising a shredder for comminuting the organic solids separated from the grit by said jig and delivering such comminuted organic solids to said receiving tank, a sedimentation tank for the organic solids, and means for delivering sewage liquid from said receiving tank to said sedimentation tank.

3. In automatic sewage treating apparatus, the combination with a sewage grit settling tank in the line of flow of sewage to be treated, of an auxiliary tank for receiving the overflow of sewage from said settling tank, a continuously operated jig, continuously operated conveyor apparatus for collecting settled solids from the bottom of said settling tank and delivering the same to said jig, continuously operated means for comminuting the organic solids received from said jig and flowing the same to said auxiliary tank, and means for continuously conveying the grit away from said jig, the construction and arrangement being such that as the flow of sewage through said tanks to a sewage treating system continues the collection of the grit and organic solids from the bottom of the settling tank and the delivery thereof to said jig continues automatically while the separation of the organic solids from the grit and the comminution of the organic solids for flow to said auxiliary tank and return to the sewage line in the sewage treating system also continues automatically.

4. In a sewage treatment system, the combination with a grit settling tank, of a classifier for separating organic solids from the grit, an auxiliary tank for receiving sewage from said settling tank, means for comminuting organic solids received from said classifier and delivering the same to said auxiliary tank, and motor operated mechanism for collecting settled solids from said grit settling tank and delivering the same to said classifier, the construction and arrangement being such that all of the aforesaid operations may be carried on continuously and automatically while the sewage flows continuously through said grit settling tank into said auxiliary tank in the sewage treatment system.

5. In a sewage treatment system, the combination with a tank having a grit settling compartment and a sewage receiving compartment, of a sewage sedimentation tank, a pump connected between the said receiving compartment and said sewage sedimentation tank, conveyor apparatus for collecting settled solids from said grit settling compartment and conveying such solids upwardly out of said last-named compartment, a jig, means for directing the collected solids from said conveyor apparatus to said jig, mechanism for conveying the separated grit from said jig, and means for comminuting the organic solids separated from the grit by said jig and flowing such comminuted organic solids into said receiving compartment for flow therefrom together with the sewage therein through said pump to said sewage sedimentation tank.

6. In sewage treating apparatus, the combination with a sewage grit settling tank in a sewage flow line, of a jig type classifier for separating the grit from organic solids, means for delivering settled solids in said tank to said classifier, mechanism for comminuting the organic solids received from the classifier, and means for flowing the ground material into the sewage flow line.

7. In sewage treatment apparatus, the combination with a sewage grit settling tank, of a classifier for separating the grit from organic solids, means for delivering settled solids in said tank to said classifier, mechanism for grinding the organic solids received from said classifier, and means for flowing the ground materials back into the said grit settling tank.

8. In sewage treating apparatus, the combination with a sewage grit settling tank, of a classifier for separating grit from organic materials, means for delivering settled solids in said tank to said classifier, mechanism for grinding the organic solids received from the classifier, a pipe for receiving the ground materials from said grinding mechanism and direct the same into said tank, and a valve in said pipe for controlling the flow of ground materials into said tank.

9. In sewage treatment apparatus, the combination with a sewage grit settling tank in a sewage flow line, of a classifier for separating grit from organic solids, means for delivering a mixture of grit and organic material from said tank to said classifier, mechanism for grinding the solids received from said classifier, such solids being either entirely organic or a mixture of organic solids and such inorganic solids as have not been removed by the classifier, a pipe for directing the flow of ground materials back into the settling tank for retreatment, an additional pipe for directing the flow of ground materials from said grinding mechanism into the sewage line beyond the settling tank, and means for controlling the flow of ground materials in said pipes so that retreatment may be afforded when desirable or the flow may be directed into the sewage flow line without retreatment when retreatment is not necessary.

RICHARD D. NICHOLS.

CERTIFICATE OF CORRECTION.

Patent No. 2,309,002.　　　　　　　　　　　　　　　January 19, 1943.

RICHARD D. NICHOLS.

It is hereby certified that error appears in the printed specification of the above numbered patent requiring correction as follows: Page 2, first column, line 51, for "trained" read --drained--; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.